3,575,937
IONIC POLYMERIZATION OF LACTAMS WITH A DERIVATIVE OF A CARBOXYLIC ESTER OF A KETOXIME AS PROMOTER
Johan A. Bigot, Beek, Limburg, Johannes van Mourik, Geleen, and Johannes van Beveren, Sittard, Netherlands, assignors to Stamicarbon N.V., Heerlen, Netherlands
No Drawing. Filed July 24, 1967, Ser. No. 655,270
Claims priority, application Netherlands, Aug. 4, 1966, 6610959
Int. Cl. C08g 20/10
U.S. Cl. 260—78
5 Claims

ABSTRACT OF THE DISCLOSURE

The use of carboxylic esters of ketoximes, in which an acyl radical has been substituted in the molecule for one of the hydrocarbon radicals of the ketoxime, as promoters, used in conjunction with catalysts, in the ionic polymerization of lactame, is disclosed. The use of such promoters permits rapid polymerization with high yields of amide polymers, which are useful in the production of molded products.

BACKGROUND OF THE INVENTION

In the ionic polymerization of lactams, the prior art has accelerated the polymerization, which is usually carried out with an alkali metal compound as the catalyst, by additionally using a promoter. The promoters used by the prior art were nitrogenous compounds such as isocyanates, carbodiimides and cyanamides. In general, these prior art promoters were compounds with a tertiary nitrogen atom bound to a carbonyl, thiocarbonyl, sulphonyl or nitroso group. The use of promoters allows the lactam polymerization to be carried out in a relatively short period of time and at temperatures lower than the melting point of the resultant polymers, so that lactams whose molecules contain at least 6 carbon atoms in the ring can be polymerized to form a solid product which adopts the shape of the reaction space, or reaction zone, in which the polymerization has been conducted.

SUMMARY OF THE INVENTION

The present invention is directed to the ionic polymerization of lactams or mixtures of lactams in the presence of a catalyst and a promoter, wherein the promoter is a carboxylic ester of a ketoxime in which an acyl radical has been substituted in the molecule for one of the hydrocarbon radicals of the ketoxime. The promoters accelerate the polymerization reaction, and allow the production of useful molded products.

GENERAL DESCRIPTION OF THE INVENTION

Lactams, such as omega lactams, are polymerized in high yields and in short reaction times by ionic catalytic polymerization in the presence of a promoter, wherein the promoter is a carboxylic ester of a ketoxime in which an acyl radical has been substituted in the molecule for one of the hydrocarbon radicals of the ketoxime. Preferred carboxylic esters of substituted ketoximes are of the general formula

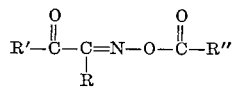

wherein R, R' and R" each contain 1–18 carbon atoms and are independently selected from the group consisting of alkyl including, cycloalkyl and aryl. Among suitable alkyl, cycloalkyl and aryl groups may be mentioned methyl, ethyl, propyl, hexyl, dodecyl, cyclopentyl, cyclohexy and phenyl. Preferably, R, R', R" are independently methyl or phenyl. Examples of suitable promoters that may be mentioned, by way of example and not of limitation, are acetyl - methyl-carbimino-acetate, benzoyl-phenyl-carbimino - acetate, acetyl-ethyl-carbimino-acetate acetyl-methyl-carbimino-benzoate benzoyl-methyl-carbimino-benzoate.

The lactam can be mixed with the catalyst and the promoter in any conventional way. Preferably, the lactam is melted, the catalyst is distributed in the melt, and the mixture is then heated to polymerization temperature and then the promoter is added.

The reaction can be carried out at the conventional temperatures for the ionic polymerization of lactams, i.e., at temperatures within the range of 90–250° C. Preferably, the initial temperature is within the range of 90–150° C. Because of the exothermic nature of the polymerization reaction, the temperature generally rises during polymerization, but usually remains below 200–215° C. The ionic polymerization of lactams using promoters of the present invention will generally be complete within a very short time period, often in less than 10 minutes. If the reaction temperature is between the melting point of the monomeric lactams and that of the resultant polymer, the polymerization yields solid macromolecular products in the form of molded products whose dimension corresponds to those of the reaction vessel in which the polymerization has been effected.

Suitable catalysts for use in conjunction with the promoter include, for instance, lactam-metal compounds containing a metal atom bound to the nitrogen atom of the lactam, such as, for example, sodium caprolactam. The catalyst may be formed in situ by the use of substances which upon reaction with a lactam yield the desired lactam-metal compounds. Suitable compounds for the in situ formation of the catalyst include metal-triisopropylaluminum, diethylzinc, alkali metals, alkaline, earth metals, and compounds of alkali metals and alkaine earth metals which exhibit an alkaline reaction such as hydrides, oxides, hydroxides, and carbonates as well as Grignard compounds, such as alkylmagensium-bromide and acrylmagnesiumbromide.

The amount of catalyst used may vary over wide limits. Generally, at least 0.1 mole percent of the catalyst will be used, and preferably from about 0.1 to about 3 mole percent, with respect to the amount of monomer to be polymerized, of the catalyst will be used, although larger amounts, such as 5 or 10 mole percent, or even higher, may be used. Generally, no advantages are obtained by using amounts of catalysts in excess of 10 mole percent. Therefore, the catalyst will generally be within the range of 0.1 to 10 mole percent, based on the moles of monomers which are to be polymerized.

The amount of promoter may likewise be varied over wide limits. The promoter will generaly be used in amounts of about 0.05 to about 10 mole percent, based on the moles of monomers to be polymerized, and preferably the promoter is within the range of 0.05 to 2 mole percent. Even larger amounts of the promoter may be used in such cases the degree of polymerization will be lower than if the preferred amounts of promoter are used.

The lactams are preferably omega lactams, such as butyrolactam, caprolactam, oenantholactam, caprylolactam, decyllactam, undecyllactam and laurinolactam. The structure and the properties of the resultant polymers may be influenced by polymerizing a mixture of monomers such as 2, 3 or more lactams, to form copolyamides. As example of copolyamides which can be produced by the present invention may be mentioned oenantholactam-caprolactam-laurinolactam-copolyamides, laurinolactam-oenantholactam-copolyamides, undecyllactam-caprolactam-copolyamides, caprolactam-caprylolactam-laurinolactam-copolyamides, laurinolactam - caprolactam - copolyamides, and butyrolactam-caprolactam-copolyamides.

A wide variety of conventional additives may be added to the monomeric lactams to produce special polymeric products. For example, the appearance and the properties of the polymers may be changed by the addition of suitable additives. Among such additives, which can be distributed in the lactam melt, may be mentioned various boring agents and also inert fillers such as wood meal, carborundum, carbon black, powdered shale, coal dust, and coke dust. Natural and/or synthetic fibers, filaments and/or fabrics made therefrom may be worked into the lactam melt. Macromolecular products such as polystyrene, polyformaldehyde, polypropylene, polyethylene, polyamides, and polycondensation products of aldehydes with phenol, melamine and/or urea may be incorporated into the lactam melt to modify the properties of the resultant lactam polymer. If cellular products are desired, suitable swelling agents, for example, hydrocarbons which vaporize during the polymerization, may be mixed into the starting materials.

The invention will be understood more readily by reference to the following examples; however, these examples are intended to illustrate the invention and are not to be construed to limit the scope of the invention.

EXAMPLE I

A glass cylinder of 2.5 cm. diameter was placed in an oil bath maintained at a temperature of 150° C. A molten mixture of epsilon-caprolactam (20 g.) and potassium caprolactam (0.4 g. 1.5 mole percent) was introduced into the cylinder and a current of nitrogen was passed into the molten mixture by way of an inlet tube. Thereafter, acetyl-methylcarbimino-acetate (0.6 mole percent) was added by way of the nitrogen gas stream, and after 30 seconds the nitrogen current was stopped and the inlet tube was removed. After 6 minutes the polymerization was complete. The polymerized epsilon-caprolactam had assumed the form of the glass cylinder, and the resulting bar exhibited good physical properties, suggesting its application in a wide variety of uses, such as molded housings, gears, and the like.

EXAMPLE II

The polymerization as described in Example I was repeated except that the promoter was acetyl-methyl-carbimino-benzoate (0.6 mole percent). Polymerization was complete and the resulting bar removed from the glass cylinder after 5.2 minutes. The polymer had attractive physical properties.

EXAMPLE III

The polymerization as described in Example I was repeated except that the promoter was benzoyl-methyl-carbimino-benzoate (0.6 mole percent). Polymerization was complete, and the resulting bar removed from the glass cylinder after 3.5 minutes.

EXAMPLE IV

The polymerization described in Example I was repeated except that the promoter was acetyl-phenyl-carbimino-benzoate (0.6 mole percent). Polymerization was complete, and the resulting bar was removed from the cylinder after 6.5 minutes.

EXAMPLE V

The polymerization described in Example I was repeated except that the promoter was benzoyl-phenyl-carbimino-benzoate (0.6 mole percent). Polymerization was complete, and the resulting bar was removed from the cylinder after 3.5 minutes.

It will be appreciated in the foregoing examples that the use of the promoters of the present invention allows the rapid ionic polymerization of lactams, and the polymerization process especially lends itself to the production of molded articles which assume the shape of the polymerization vessel or container.

Obviously many modifications and variations of the present invention are possible in the light of the above teachings. It is therefore to be understood that within the scope of the appended claims in the invention may be practiced otherwise than as specifically described.

What is claimed is:

1. In a process for the polymerization of lactams in which at least one lactam is subjected to catalytic polymerization at a temperature of about 90 to about 250° C. in the presence of about 0.1 to about 10 mole percent of at least one polymerization catalyst and about 0.05 to 10 mole percent at least one promoter, the improvement consisting essentially of using, as said promoter, at least one carboxylic ester of ketoxime in which an acyl radical has been substituted in the molecule for one of the hydrocarbon radicals of the ketoxime, the said promoter being of the general formula:

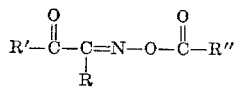

wherein R, R', and R" contain 1–18 carbon atoms and are independently selected from the group consisting of alkyl and aryl.

2. The process as claimed in claim 1, wherein the promoter is selected from a group consisting of acetyl-methyl-carbimino-acetate, benzoyl - phenyl - carbimino - acetate, acetyl - ethyl - carbimino-acetate, acetyl-methyl-carbimino-benzoate, benzoyl - methyl - carbimino - benzoate, acetyl-phenyl - carbimino - benzoate, benzoyl-phenyl-carbimino-benzoate and mixtures thereof.

3. The process as claimed in claim 2, wherein from about 0.1 to 3 mole percent of catalyst, and about 0.05 to 2 mole percent of promoter are used.

4. The process as claimed in claim 2, wherein the reaction temperature is between the melting point of the lactam and the melting point of the resulting polymeric product, and the polymerization is conducted within a reaction vessel, whereby the resultant polymeric products assume the shape of the reaction vessel.

5. The process as claimed in claim 2, wherein the lactam is selected from the group consisting of butyrolactam, caprolactam, oenantholactam, caprylolactam, decyllactam, undecyllactam, or laurinolactam and mixtures thereof.

References Cited

UNITED STATES PATENTS 3,220,983 11/1965 Schmidt et al. _____ 260—78
3,342,784 9/1967 Gehm et al. _____ 260—78

HAROLD D. ANDERSON, Primary Examiner